Aug. 21, 1956  J. B. WHEATLEY  2,759,700
BEARING COOLING SYSTEM
Filed Feb. 4, 1950
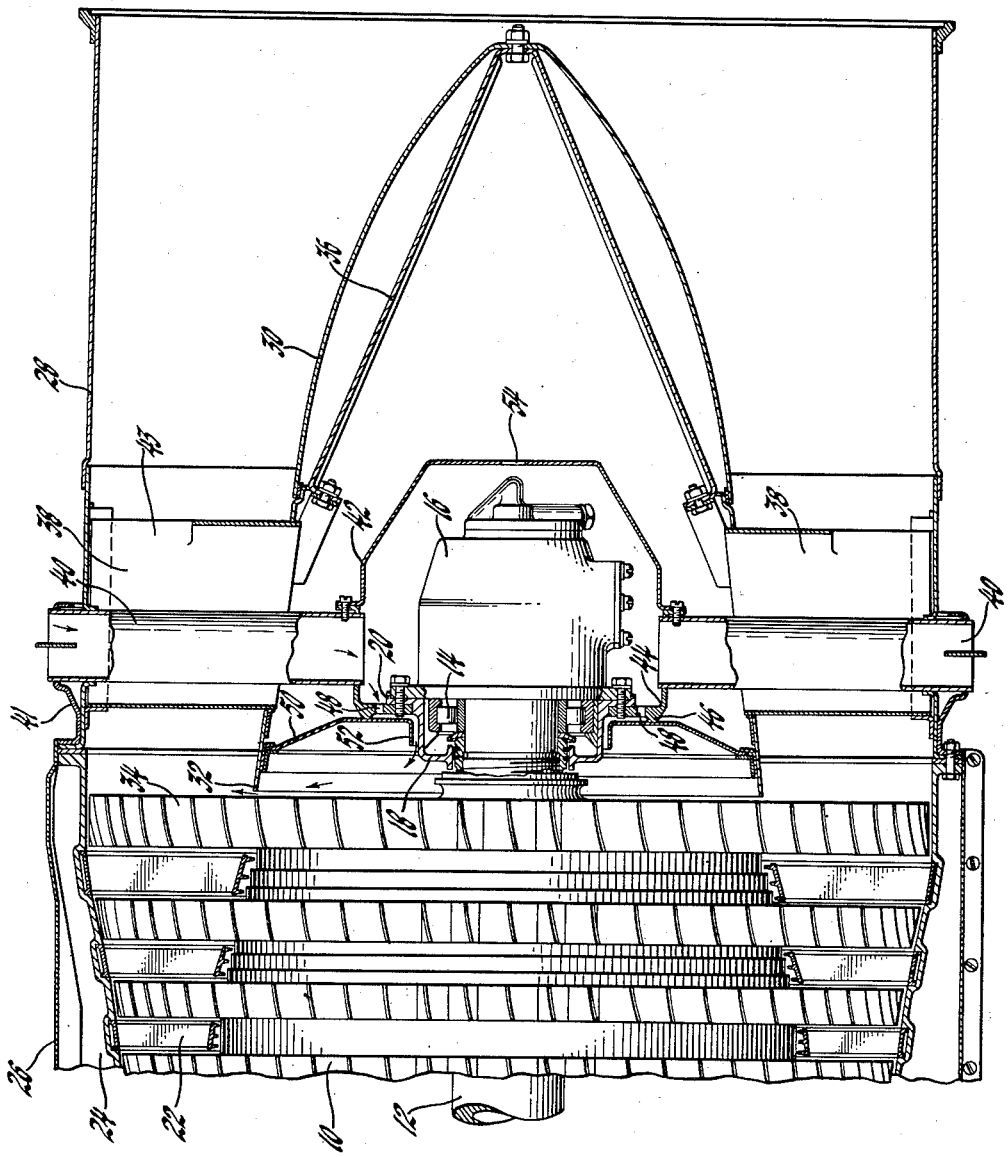
Inventor
John B. Wheatley
By
Willits, Helmig & Baillio
Attorneys

United States Patent Office 2,759,700
Patented Aug. 21, 1956

2,759,700

BEARING COOLING SYSTEM

John B. Wheatley, Indianapolis, Ind., assignor to General Motors Corporation, Detroit, Mich., a corporation of Delaware Application February 4, 1950, Serial No. 142,425

10 Claims. (Cl. 253—39.1)

This invention relates to combustion engine power plants, and more particularly to a turbine power plant with an air-cooled bearing.

The invention concerning a power plant with an air-cooled bearing is illustrated on the rear bearing for the turbine of a turbine power plant. The power plant housing has an external shell portion to support the stator. The stator consists of a plurality of segments attached to the internal surface of the shell. The stator blades extend from the segments and are positioned in annular rows between the annular rows of blades on the turbine rotor. Internal and external tail cones are positioned in coaxial alignment with the inner and outer portions of the blades to provide an annular exhaust passage. The turbine rotor shaft is rotatably mounted in suitable bearings. The rear bearing, which is located within the center of the annular exhaust passage, is supported and partially surrounded by a cooling air chamber. A plurality of cooling air ducts extending from the external shell to the chamber radially through the exhaust passage provide a passage for the cooling air and support the chamber and bearing. Hollow struts are secured in the exhaust passage surrounding the cooling air ducts to support the internal tail cone and provide a passage around the ducts. The cooling air enters through the ducts to the cooling air chamber around the bearing and the lubricating oil system. A flow passage from this cooling chamber leads through an aperture in the forward wall to the space between the last turbine wheel and the end partition of the turbine unit where the air is drawn or aspirated into the turbine exhaust passage. Another passage from the cooling chamber extends through an aperture in the rear wall to the space within the tail cone and is drawn out through an aperture. Thus a continuous circulation of air from the atmosphere into the bearing cooling chamber and then into the turbine exhaust is maintained by the low pressure in the exhaust passage.

The primary object of this invention is to provide in a rotary machine having a fluid flow passage and a bearing, an air passage for leading cooling air to the bearing and from the bearing to the fluid flow passage, so that the air is sucked into the passage to provide a circulation of cool air past the bearing.

Another object of the invention is to provide in a turbine internal combustion engine a cooling air passage which draws air past a portion of the engine to be cooled and then leads the air to the low pressure exhaust passage, so that the cooling air is aspirated into the passage to provide a circulation of air past the part to be cooled.

Another object of the invention is to provide in a turbine type internal combustion engine having the bearing surrounded by an annular passage for the exhaust gases, a cooling air passage connecting atmospheric air to a chamber surrounding the bearing and an outlet passage connecting the chamber to the passage for the low pressure exhaust, so that air is aspirated into the exhaust passage to circulate cool air past the bearing.

These and other objects of the invention will be more fully explained by the detail description and drawing of the specification.

The drawing shows a partial section with parts broken away to show the details of the invention on a turbine engine.

In the drawing, the rear portions of a turbine engine showing a portion of the turbine and the exhaust passages and the rear turbine bearing are shown in order to illustrate the invention. The turbine wheels 10 are mounted on the main shaft 12 which is rotatably supported in a bearing 14. The bearing has at its rear end a suitable lubricating oil pump housing and sump 16 and at its forward end a seal 18 to prevent the leakage of lubricating oil into the turbine unit. The bearing 14 and the seal 18 are mounted on a bearing support member 20 which surrounds these elements.

The turbine wheels 10 rotate between blades 22 on the stator housing 24. The stator housing or shell 24 is supported at its inner end by being secured to the main power plant frame. The shroud 26 is secured to the stator 24 of the power plant. An exhaust tail pipe or external tail cone 28 is secured to the end of the stator 24 and provides the external wall for the turbine exhaust passage.

A generally conical fairing member or internal tail cone 30 forms the internal wall of the passage and has its large end 32 positioned adjacent the last turbine wheel 34 which is solid and forms a partition. The large end 32 of the fairing has a diameter equal to the diameter of the turbine wheel at the root of the blades. The fairing or cone 30 then generally tapers to the point at the end of the passage. The end of the fairing 30 is replaceable and has internal braces 36. Fairing member 30 is supported from the external shell 28 by hollow struts 38 or some other suitable struts.

Cooling air conduits 40 are secured in apertures in the extension 41 of the shell 24 and extend radially to the centrally located housing or casing 42 defining a cooling air chamber. The inner ends of the conduits 40 are secured in apertures in the forward wall 44 of the housing 42 in order to support the housing 42 and the bearing 14. The conduits 40 extend through the exhaust passage and pass through a closely fitting aperture in the external tail cone 28 and through a large aperture in the internal tail cone 30. A hollow strut 38 surrounds each conduit 40 and is secured to the outer tail cone 28 and to the edge of the aperture in the inner tail cone 30 to provide a passage surrounding the conduit 40 which opens to the interior of the inner tail cone 30. An opening 43 in the rear portion of the strut 38 provides communication with the exhaust passage.

The cooling chamber housing 42 has an annular wall 44 at the forward end secured to the bearing support member 20. The outer edge of this wall has an annular rib 46 and a series of apertures 48 just within the rib. The turbine has an annular end partition 50 which is secured to the inside of the fairing member 30 adjacent the end 32. This partition 50 has an annular shape and extends inwardly and presses against the rib 46 in sealing relation. The partition is thus spaced from the wall 44 and has an axial flange 52 spaced from the member 20 to provide an annular passage around the bearing. The cooling chamber housing 42 has an aperture 54 in the rear wall to allow cooling air to enter the inner tail cone 30 and pass out through the passage between strut 38 and conduit 40 and aperture 43 in the strut 38.

In the normal operation of turbine power plants the rear turbine bearing tends to become overheated due to the normal generation of heat in bearings, and the fact that it is surrounded by the hot exhaust gas passage. Thus, in accordance with this invention, cooling air conduits 40 are provided which extend through the hollow strut 38 from the atmosphere outside the power plant to a cool air chamber in 42 surrounding the bearing 14 and the lubricating oil pump 16. The air then flows out of the apertures 48 in the forward wall 44 of the cooling air chamber between the partition 50 and its flange 52 and the bearing to the space between the partition 50 and the last turbine wheel 34. The air in this space is drawn or aspirated out of the space between the turbine wheel 34 and the forward edge 32 of the fairing 30 by the action of the gases flowing through the low pressure exhaust passage of the turbine. Similarly air will be drawn from the cooling air chamber 42 through aperture 54, into the fairing or interior tailcone 30. Then the air will move out through the passage between struts 38 and conduits 40 to enter the exhaust passage through aperture 43 in the fins 38. Due to the absorption of energy by the turbine wheels 34, the pressure at this point is lower than atmospheric. Air will flow from the outside through the cooling conduits to the chamber and through a forward or rear flow channel to the exhaust passage due to this pressure differential. Thus there is a continuous supply of cool air flowing over the rear bearing of this turbojet power plant.

The above specific embodiment is illustrative of the invention and may be modified in many ways within the scope of the appending claims.

I claim:

1. In a power plant, a central shaft, a rear bearing supporting said shaft, a rotor on said shaft, a stator, said stator and rotor having blades, a pair of concentric walls providing an annular motive fluid passage having an exhaust passage portion extending from said blading and surrounding said bearing, radial struts having an aperture therein extending between said walls and through said passage, a cooling chamber surrounding said bearing, means to conduct cooling air through said struts to said chamber, and means to conduct air from said cooling chamber to the interior of said inner wall and through said struts and out of said aperture to said annular passage to draw air through the cooling chamber to cool the bearings and through the interior of said annular passage to cool the wall.

2. In a power plant, a central shaft, a rear bearing supporting said shaft, a rotor on said shaft, a stator, said rotor having blades, inner and outer concentric walls providing a motive fluid passage having an annular exhaust passage portion extending from said blades and surrounding said bearing, radial struts providing air outlet passages extending between said walls and through said exhaust passage portion, a cooling air conduit providing air inlet passages extending through said struts, a cooling chamber spaced inwardly from said inner concentric wall surrounding said bearing and connected to said conduit to form a cooling chamber surrounding said bearing, means to form a collecting chamber between said cooling chamber and said inner concentric wall, means to connect said cooling chamber to said collecting chamber, said collecting chamber communicating with said radial struts, and an outlet opening in said radial strut within said annular exhaust passage portion so that cooling air is drawn outwardly into the exhaust passage.

3. A gas turbine engine comprising, in combination, a turbine wheel, spaced inner and outer walls defining an annular duct for motive fluid flowing through the wheel, the inner wall converging to provide an exhaust tailcone, a first wall adjacent the turbine wheel and defining a space between the turbine wheel and the first wall, a second wall defining a first chamber within the inner wall between the first and second walls, means for leading cooling air into the first chamber, a connection for conducting cooling air from the first chamber into the said space adjacent the turbine axis, the said inner wall being spaced from the turbine wheel to provide a gap for flow of cooling air from the space into the motive fluid duct, the tailcone defining a second chamber enclosing the first chamber, a connection for flow of cooling air from the first chamber into the second chamber, and means providing an outlet for the flow of cooling air from the second chamber over the second wall into the motive fluid duct, the said gap and the said outlet being so located and disposed that air is drawn and aspirated therefrom into the motive fluid duct.

4. A gas turbine engine comprising, in combination, a turbine wheel, a shaft therefor, a bearing for the shaft adjacent the wheel, a housing enclosing the bearing, means defining an inlet for cooling air into the said housing, a casing enclosing the housing, means defining a first outlet from the housing external to the casing for discharging cooling air from the housing exteriorly of the casing, means defining a second outlet in the housing into the casing spaced remotely from the turbine wheel for discharging cooling air from the housing into the casing, and means defining a discharge outlet from the casing remote from the second outlet, whereby the exterior of the housing is bathed by the air flowing from the housing through the casing to the said discharge outlet.

5. A gas turbine engine comprising, in combination, a turbine wheel, a shaft therefor, a bearing for the shaft adjacent the wheel, a housing enclosing the bearing, means defining an inlet for cooling air into the said housing, a casing enclosing the housing, means defining a first outlet from the housing adjacent the turbine wheel for discharging cooling air from the housing against the turbine wheel, means defining a second outlet in the housing into the casing spaced remotely from the turbine wheel for discharging cooling air from the housing into the casing, and means defining a discharge outlet from the casing remote from the second outlet, whereby the exterior of the housing is bathed by the air flowing from the housing through the casing to the said discharge outlet.

6. A gas turbine engine comprising, in combination, a turbine wheel, a shaft therefor, a bearing for the shaft adjacent the wheel, a housing enclosing the bearing, means defining an inlet for cooling air into the said housing, a casing enclosing the housing, means defining a first outlet from the housing adjacent the turbine wheel for discharging cooling air from the housing against the turbine wheel, means defining a second outlet from the housing into the casing for discharging cooling air from the housing into the casing, means defining a discharge outlet from the casing remote from the second outlet and cooperating therewith whereby the exterior of the housing is bathed by the air flowing from the housing through the casing to the said discharge outlet, and means for aspirating the air discharged from the housing through said outlets into the path of motive fluid exhausting from the turbine wheel.

7. A gas turbine engine comprising, in combination, a turbine wheel, spaced outer and inner wall means defining an annular duct for motive fluid flowing through the wheel, a first wall adjacent the turbine wheel connected to the inner wall means and defining a space between the turbine wheel and the first wall, a second wall defining a first chamber within the inner wall means of the motive fluid duct, means for leading cooling air into the first chamber, a connection for conducting cooling air from the first chamber into the said space adjacent the turbine axis, the said inner wall means being spaced from the turbine wheel to provide a gap for flow of cooling air from the space into the motive fluid duct, the inner wall means and the first wall defining a second chamber enclosing the first chamber, a connection for flow of cooling air from the first chamber into the second chamber, and means providing an outlet for the flow of cooling air from the second chamber over the second wall into the motive fluid duct.

8. A gas turbine engine comprising, in combination, a turbine wheel, spaced outer and inner wall means defining an annular duct for motive fluid flowing through the wheel, a first wall adjacent the turbine wheel connected to the inner wall means and defining a space between the turbine wheel and the first wall, a second wall defining a first chamber within the inner wall means of the motive fluid duct, means for leading cooling air into the first chamber, a connection for conducting cooling air from the first chamber into the said space adjacent the turbine axis, the said inner wall means being spaced from the turbine wheel to provide a gap for flow of cooling air from the space into the motive fluid duct, the inner wall means and the first wall defining a second chamber enclosing the first chamber, a connection for flow of cooling air from the first chamber into the second chamber, and means providing an outlet for the flow of cooling air from the second chamber over the second wall into the motive fluid duct, the said gap and the said outlet being located downstream of the turbine in the motive fluid duct and being so disposed that the cooling air is aspirated therefrom into the motive fluid duct.

9. A gas turbine engine comprising, in combination, a turbine including a turbine wheel, means defining an annular duct for motive fluid flowing through the turbine, a turbine shaft bearing supporting the turbine wheel, a first casing enclosing the bearing and defining a first cooling chamber, means defining a second casing around the first casing, the casings defining a second cooling chamber isolating the first chamber from the motive fluid duct, a conduit for leading cooling air into the first chamber, a connection between the chambers for leading the air from the first cooling chamber into the second cooling chamber, and an outlet from each said cooling chamber, the outlet from the first cooling chamber being an annular duct extending over the bearing and communicating with the motive fluid duct providing an annular flow path over the bearing between the bearing and the motive fluid duct.

10. A gas turbine engine comprising, in combination, a turbine including a turbine wheel, means defining an annular duct for motive fluid flowing through the turbine, a turbine shaft bearing supporting the turbine wheel, a housing defining an oil sump for the bearing, a first casing enclosing the bearing and housing and defining a first cooling chamber, means defining a second casing around the first casing, the casings defining a second cooling chamber isolating the first cooling chamber from the motive fluid duct, a conduit for leading cooling air into the first chamber, a connection between the chambers for leading the air from the first cooling chamber into the second cooling chamber, and an outlet connection from each said cooling chamber into the motive fluid duct, each connection including means for aspirating the air from the chamber into the duct.

References Cited in the file of this patent

UNITED STATES PATENTS

| | | |
|---|---|---|
| 2,401,826 | Halford | June 11, 1946 |
| 2,434,134 | Whittle | Jan. 6, 1948 |
| 2,461,239 | Schuster | Feb. 8, 1949 |
| 2,479,573 | Howard | Aug. 23, 1949 |
| 2,620,157 | Morley et al. | Dec. 2, 1952 |

FOREIGN PATENTS

| | | |
|---|---|---|
| 617,474 | Great Britain | Feb. 7, 1949 |